United States Patent
Wood et al.

Patent Number: 5,084,230
Date of Patent: Jan. 28, 1992

[54] HAND HELD TOOL FOR REMOVING AND REPLACING A REMOVABLE TOP NOZZLE

[75] Inventors: John D. Wood, Greensburg; Alan Savinell, Penn Hills; Stephen J. Ferlan, Wilkins Twp., all of Pa.

[73] Assignee: Westinghouse Electric Corp., Pittsburgh, Pa.

[21] Appl. No.: 626,518

[22] Filed: Dec. 12, 1990

[51] Int. Cl.⁵ .......................... G21C 19/10
[52] U.S. Cl. .................... 376/261; 376/446
[58] Field of Search ............ 376/260, 261, 262, 446

[56] References Cited

U.S. PATENT DOCUMENTS

| | | | |
|---|---|---|---|
| 2,984,609 | 5/1961 | Dickson et al. | 204/193.2 |
| 3,603,634 | 9/1971 | Kumpf | 294/86 |
| 4,134,789 | 1/1979 | Aubert | 376/262 |
| 4,244,616 | 1/1981 | Buchalet | 294/86 A |
| 4,312,124 | 1/1982 | Calhoun | 29/726 |
| 4,631,168 | 12/1986 | Shallenberger et al. | 376/446 |
| 4,639,998 | 3/1987 | Shallenberger et al. | 29/426.5 |
| 4,646,415 | 3/1987 | Wilson et al. | 29/426.5 |
| 4,664,875 | 5/1987 | Shallenberger et al. | 376/261 |
| 4,667,547 | 5/1987 | Shallenberger et al. | 376/261 |
| 4,707,326 | 11/1987 | Wilson et al. | 376/261 |
| 4,834,934 | 5/1989 | Salton et al. | 376/271 |
| 4,885,123 | 12/1989 | Ikeuchi et al. | 376/233 |
| 4,919,881 | 4/1990 | Hankinson et al. | 376/260 |

Primary Examiner—Brooks H. Hunt
Assistant Examiner—Frederick H. Voss

[57] ABSTRACT

A hand held tool for removing a top nozzle from guide thimbles of a nuclear fuel assembly includes a handling assembly, a lower tool head, a coupling structure, and an actuating mechanism. The handling assembly includes an upper handle and an elongated handle pole attached to the upper handle and extending downwardly therefrom. The lower tool head includes an anchor assembly and a lift assembly. The anchor assembly has elongated probe members insertable into the guide thimbles and expansion sleeves thereon actuatable by the actuating mechanism between disengaged and engaged conditions with the guide thimble. The coupling structure couples both the lift assembly and anchor assembly to the lower end of the handle pole. The coupling structure is operable for connecting the lift assembly and handle pole in a first connected relation in which the lift assembly can be rotated by rotation of the handle pole between unlocked and locked positions relative to the top nozzle and unlatched and latched positions relative to the anchor assembly or in a second connected relation in which the lift assembly can be axially moved by rotation of the handle pole along the handle pole relative to the anchor assembly to cause lifting and detaching of the top nozzle from the guide thimble.

17 Claims, 13 Drawing Sheets

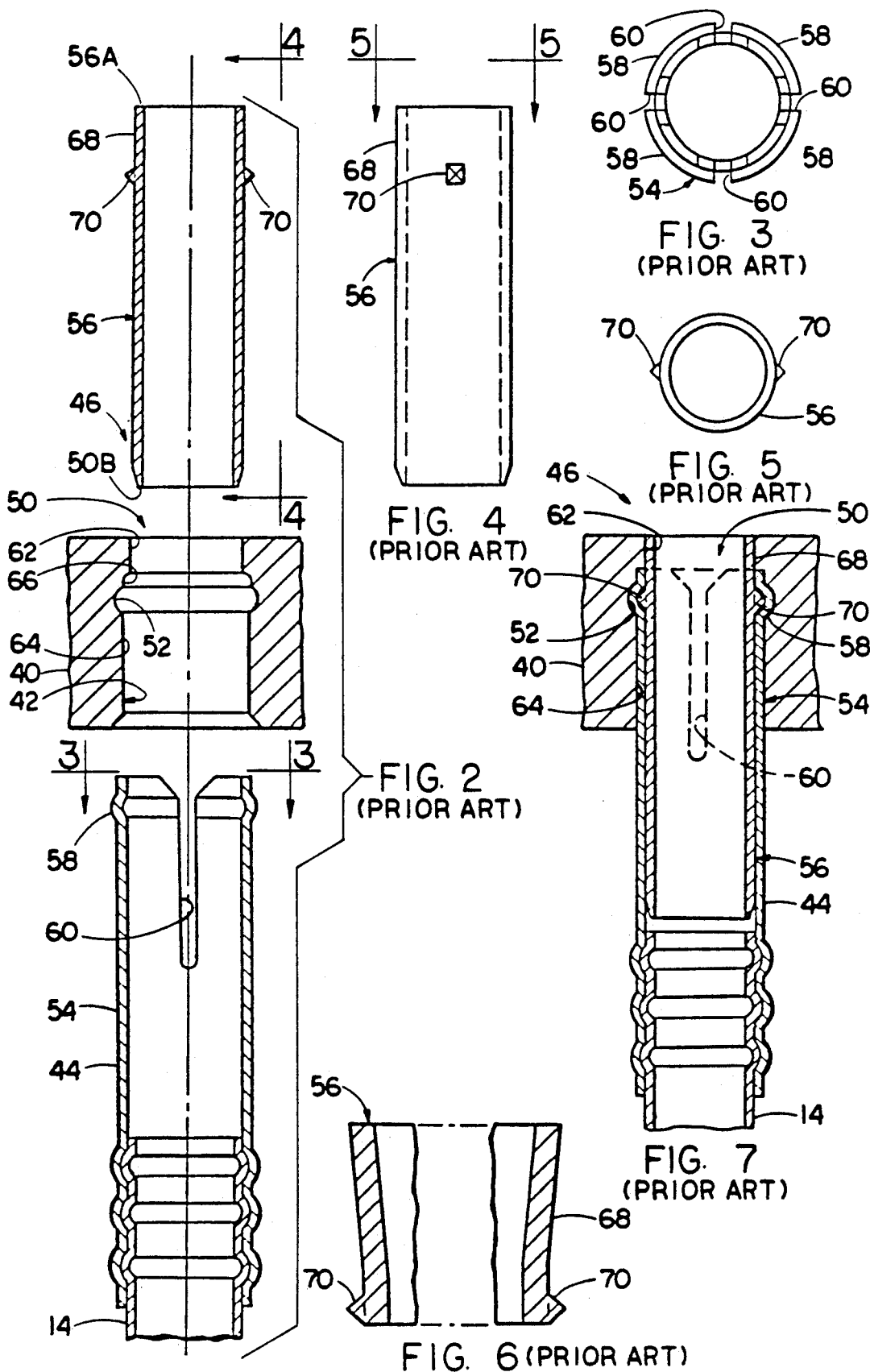

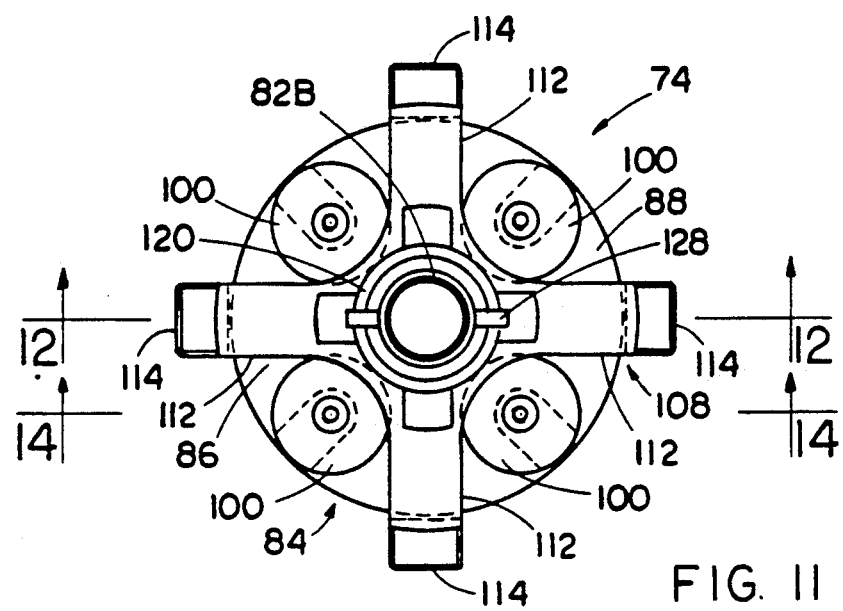
FIG. 11
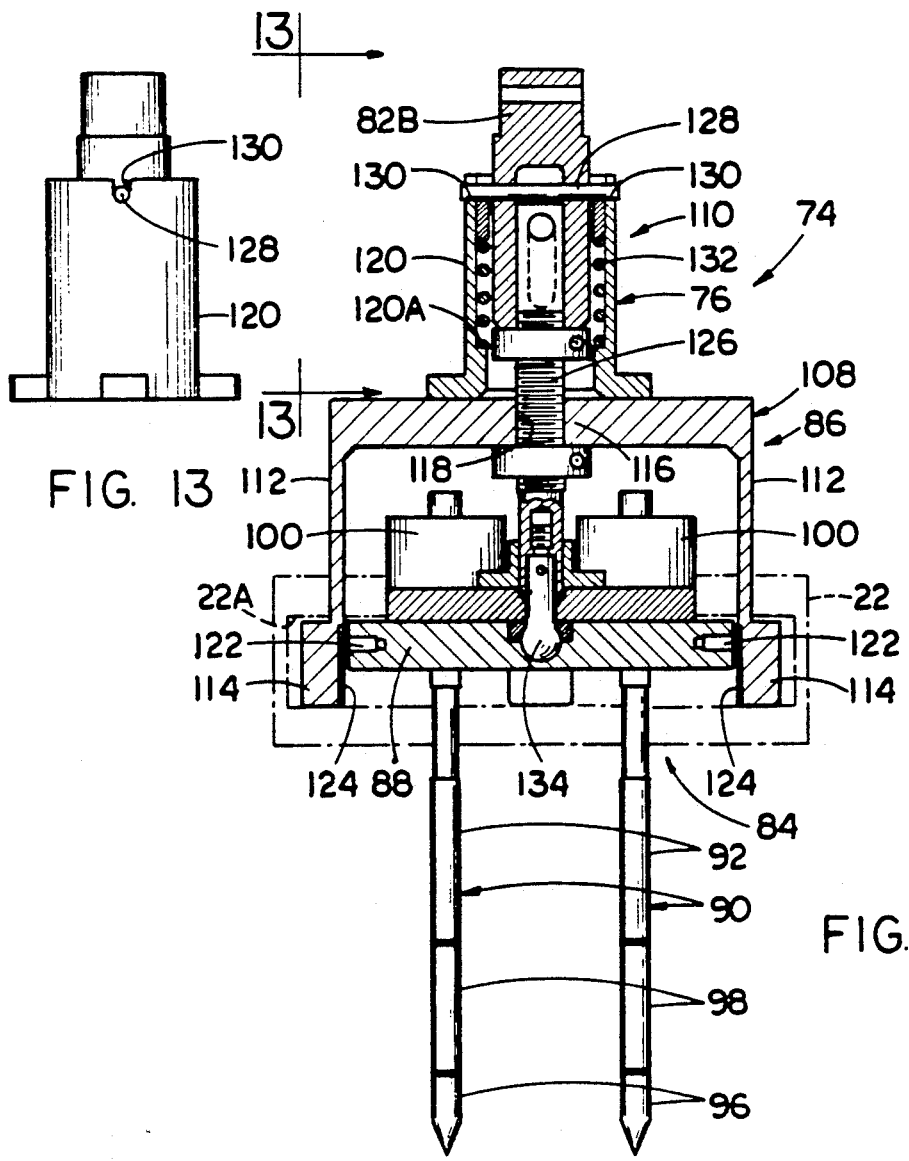
FIG. 13
FIG. 12

HAND HELD TOOL FOR REMOVING AND REPLACING A REMOVABLE TOP NOZZLE

CROSS REFERENCE TO RELATED APPLICATION

Reference is hereby made to the following copending application dealing with related subject matter and assigned to the assignee of the present invention: "Improved Hand Held Tool For Removing And Replacing A Top Nozzle Locking Tube" by John. D. Wood et al, assigned U.S. Ser. No. 07/562,286 and filed Aug. 3, 1990.

BACKGROUND OF THE INVENTION

1. Field of the Invention

The present invention relates generally to fuel assemblies for nuclear reactors and, more particularly, is concerned with an improved hand held tool for removing and replacing a removable top nozzle of a reconstitutable fuel assembly.

2. Description of the Prior Art

In most nuclear reactors, the reactor core is comprised of a large number of elongated fuel assemblies. Conventional designs of these fuel assemblies include a plurality of fuel rods and control rod guide thimbles held in an organized array by grids spaced along the fuel assembly length and attached to the control rod guide thimbles. Top and bottom nozzles on opposite ends of the fuel assembly are secured to the guide thimbles which extend slightly above and below the ends of the fuel rods. At the top of the fuel assembly, the guide thimbles are attached in passageways provided in the adapter plate of the top nozzle. The guide thimbles may each include an upper sleeve for attachment to the top nozzle.

During operation of such fuel assembly in a nuclear reactor, a few of the fuel rods may occasionally develop cracks along their lengths, thus establishing the possibility that fission products having radioactive characteristics may seep or otherwise pass into the primary coolant of the reactor. Since the fuel rods are supported by the grids in a spaced array with the guide thimbles between the top and bottom nozzles of the fuel assembly, it is difficult to detect and remove the failed fuel rods.

Until recently, to gain access to these rods it was necessary to remove the affected fuel assembly from the nuclear reactor core and then remove the bottom nozzle after overturning the assembly. This is time consuming and requires large equipment for overturning.

In view of the high costs associated with replacing fuel assemblies, reconstitutable fuel assemblies were developed to minimize operating and maintenance expenses. The general approach to making a fuel assembly reconstitutable is to provide it with a removable top nozzle. One reconstitutable fuel assembly construction is illustrated and described in U.S. Pat. Nos. 4,631,168 to Shallenberger et al, which is assigned to the assignee of the present invention. It incorporates an attaching structure for removably mounting the top nozzle on the upper ends of the control rod guide thimbles.

The attaching structure includes a plurality of outer sockets defined in the adapter plate of the top nozzle, a plurality of inner sockets each formed on the upper end of one of the guide thimbles, and a plurality of removable locking tubes inserted in the inner sockets to maintain them in locking engagement with the outer sockets. Each outer socket is in the form of a passageway through the adapter plate which has an annular groove. Each inner socket is in the form of a hollow upper end portion of the guide thimble having an annular bulge which seats in the annular groove when the guide thimble end portion is inserted in the adapter plate passageway. A plurality of elongated axial slots are provided in the guide thimble upper end portion to permit inward elastic collapse of the slotted portion so as to allow the larger bulge diameter to be inserted within and removed from the annular circumferential groove in the passageway of the adapter plate. In such manner, the inner socket of the guide thimble is inserted into and withdrawn from locking engagement with the outer socket.

The locking tube is inserted from above the top nozzle into a locking position in the hollow upper end portion of the guide thimble forming the inner socket. When inserted in its locking position, the locking tube retains the bulge of the inner socket in its expanded locking engagement with the annular groove and prevents the inner socket from being moved to a compressed releasing position in which it could be withdrawn from the outer socket. In such manner, the locking tubes maintain the inner sockets in locking engagement with the outer sockets, and thereby the attachment of the top nozzle on the upper ends of the guide thimbles.

Furthermore, to prevent inadvertent escape due to vibration forces and the like, heretofore the locking tubes have been secured in their locking positions. In the one construction of the locking tubes disclosed in above-cited patent, after insertion of the locking tubes into their locking positions within the inner sockets of the hollow upper end portions of the guide thimbles, a pair of bulges are formed in the upper portion of each locking tube. These bulges fit into the circumferential bulge in the upper end portion of the guide thimble and provide an interference fit therewith.

In another construction of the locking tubes disclosed in U.S. Pat. No. 4,699,758 to Shallenberger et al, which is also assigned to the assignee of the present invention, several small dimples are preformed on the exterior surface of the upper end portion of the locking tube circumferentially spaced from one another and projecting from the locking tube exterior surface. The use of the preformed dimples eliminates the necessity to form bulges in the locking tube after insertion into the locking position. Also the preformed dimples allow the locking tube to be reused, whereas the bulged locking tubes were discarded after each use.

The reconstitutable fuel assembly construction briefly described above has proven to be an improvement by which domestic and foreign utilities can minimize both operating and maintenance expenses. A fixture developed for removing and replacing the top nozzle of the reconstitutable fuel assembly is disclosed in U.S. Pat. No. 4,664,875 to Shallenberger et al, also assigned to the assignee of the present invention. One major problem with the top nozzle removal and replacement fixture of the cited patent is the considerable weight of the fixture which makes it mandatory to employ an overhead crane and blocking device in order to maneuver the fixture to align and insert the lower ends of the alignments rods of the fixture through the guide thimble holes in the top nozzle and into the guide thimbles.

Consequently, a need still remains for an alternative design of a tool to use to effectively and efficiently carry out removal and replacement of the top nozzle.

SUMMARY OF THE INVENTION

The present invention provides an improved hand held tool designed to satisfy the aforementioned needs. The tool is simple, lightweight, easy to use, and effective. The tool is capable of being manually held and actuated by a user and of precise operation in removing and replacing the top nozzle from and back on the reconstitutable fuel assembly. The design of the hand held tool permits a construction that weighs approximately 45 pounds, as compared to the prior art fixture which weights approximately 200 pounds. The resulting light weight of the tool of the present invention makes it readily hand operable, permitting elimination of the necessity for overhead cranes and blocking devices required with the prior art fixture. Removal and reinstallation of top nozzles can be accomplished faster.

Accordingly, the present invention sets forth an improved hand held tool for removing a top nozzle from guide thimbles of a fuel assembly. The tool comprises: (a) a handling assembly including an upper handle and an elongated handle pole having spaced upper and lower ends, the handle pole being attached at the upper end to the upper handle and extending downwardly therefrom; (b) a lower tool head including an anchor assembly and a lift assembly, the anchor assembly being the lower end of the handle pole, matable with the guide thimble and actuatable between disengaged and engaged conditions with the guide thimble; (c) means for coupling the anchor assembly to the lower end of the handle pole and for coupling the lift assembly to the lower end of the handle pole, the coupling means being operable for connecting the lift assembly and the handle pole in a first connected relation in which the lift assembly is rotatably movable, by rotation of the handle pole, between unlocked and locked positions relative to the top nozzle and unlatched and latched positions relative to the anchor assembly or in a second connected relation in which the lift assembly is axially movable, by rotation of the handle pole, along the handle pole relative to the anchor assembly to cause lifting and detaching of the top nozzle from the guide thimble once the lift assembly is disposed in the latched position relative to the anchor assembly and in the locked position relative to the top nozzle and the anchor assembly is disposed in the engaged position with the guide thimble; and (d) means connected to the anchor assembly for actuating the anchor assembly between the disengaged and engaged conditions with the guide thimble, the actuating means being mounted on the handle pole and extending from the upper handle to the lower tool head.

More particularly, the anchor assembly includes an elongated probe member insertable into the guide thimble, the probe member having an expansion sleeve movable between expanded and contracted positions for engaging and disengaging the guide thimble. Also, the anchor assembly includes a fluid-driven actuator drivingly coupled to the probe member for actuating the expansion sleeve between the expanded and contracted positions. The actuating means includes a pressurized fluid supply mounted on the handle pole adjacent the handle of the handling assembly, and a pressurized fluid supply line extending from the supply to the probe member.

Further, the lift assembly includes a spider yoke having an upper central portion and a plurality of legs projecting radially outwardly and then downwardly from the central portion and terminating in abutments that underlie a lip on the top nozzle when the lift assembly is rotated to the locked position with the top nozzle and clear the lip on the top nozzle when the lift assembly is rotated to the unlocked position therewith. The central portion of the lift assembly spider yoke includes a central hub defining an internally threaded hole, and a central sleeve extending upwardly from the central hub and slidably fitted to the lower end of the handle pole.

The coupling means includes a screw shaft member mounted to the lower end of the handle pole and threaded into the threaded hole of the central hub of the lift assembly spider yoke, a pin attached to the lower end of the handle pole, means defined in the central sleeve of the lift assembly spider yoke for receiving the pin in a seated relationship, and means engaging the pin and the central sleeve for normally imposing a biasing force on the pin that moves the pin toward an unseated relationship with the central sleeve in which the lift assembly assumes the second connected relation with the handle pole such that rotation of the pole causes threading rotation of the screw shaft relative to the central hub and thereby axial movement of the lift assembly relative to the handle pole and anchor assembly. The pin is capable of being moved into the seated relationship with the central sleeve, by imposing a downward force on the handle pole sufficient to overcome the biasing force toward the lift assembly, in which the lift assembly assumes the first connected relation with the handle pole such that rotation of the pole causes rotation of the lift assembly relative to the anchor assembly between the locked and unlocked positions relative to the top nozzle.

The coupling means also includes a universal joint coupling the anchor assembly to the lower end of the handle pole to permit unidirectional pivotal movement of the anchor assembly relative to the guide thimble for aligning the anchor assembly therewith and mating with the guide thimble.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 2 is an axially sectioned exploded view of the components of a prior art attaching structure associated with the removable top nozzle and each of the guide thimbles of the reconstitutable fuel assembly of FIG. 1.

FIG. 3 is a top plan of the upper end of one guide thimble being a component of the prior art attaching structure as seen along line 3—3 of FIG. 2.

FIG. 4 is a side elevational view of a locking tube of the prior art attaching structure as seen along line 4—4 of FIG. 2.

FIG. 5 is a top plan view of the locking tube as seen along line 5—5 of FIG. 4.

FIG. 6 is an enlarged fragmentary axially sectioned view of the upper end of the locking tube of FIG. 4.

FIG. 7 is an axially sectioned view of the components of the prior art attaching structure of FIG. 2 being assembled together.

FIG. 11 is a top plan view of the tool head of the tool as seen along line 11—11 of FIG. 8.

FIG. 12 is a axial sectional view of the tool head taken along line 12—12 of FIG. 11.

FIG. 13 is a side elevational view of a central sleeve of the tool head as seen along line 13—13 of FIG. 12.

DETAILED DESCRIPTION OF THE INVENTION

Figure 1:
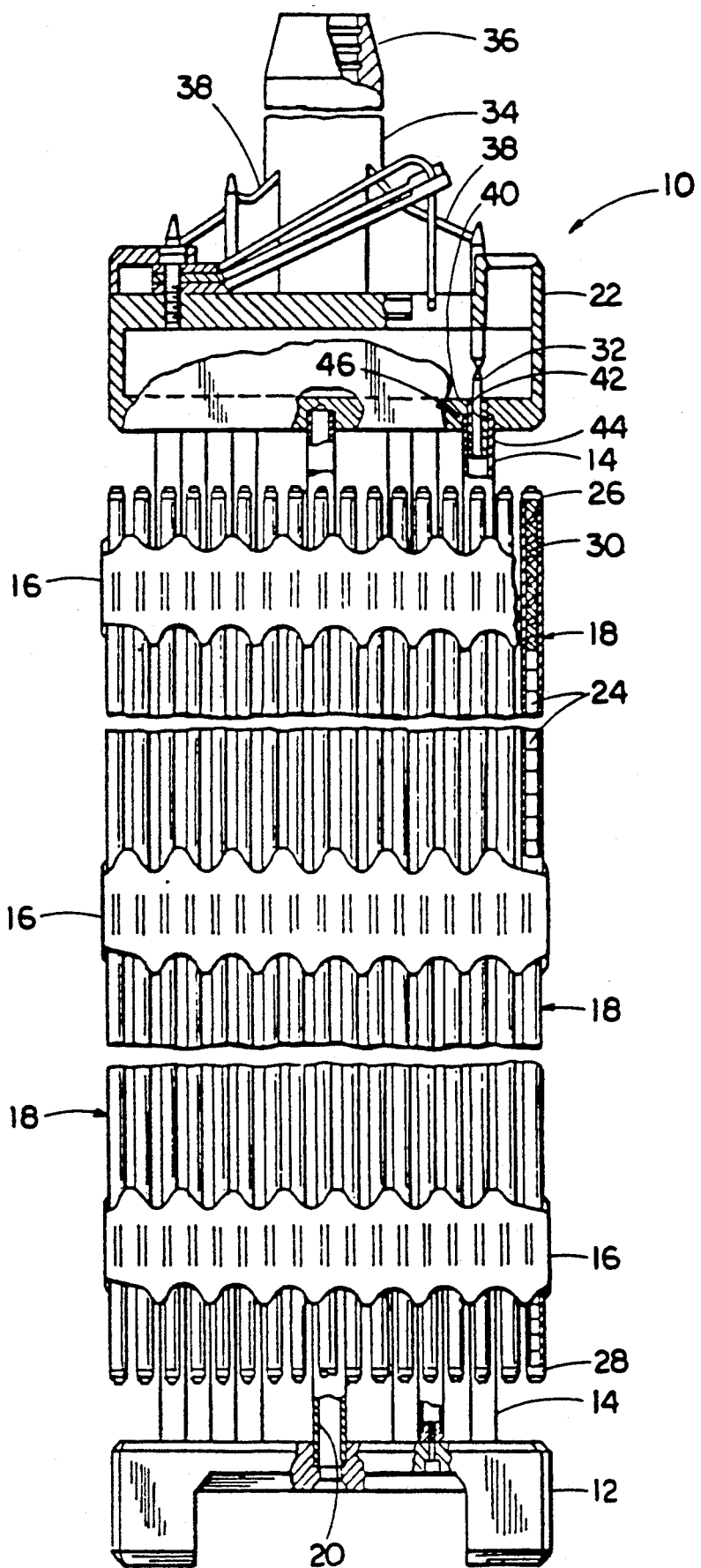
FIG. 1 is a side elevational view, with parts partially sectioned and broken away for purposes of clarity, of a prior art reconstitutable fuel assembly.
Figure 8:
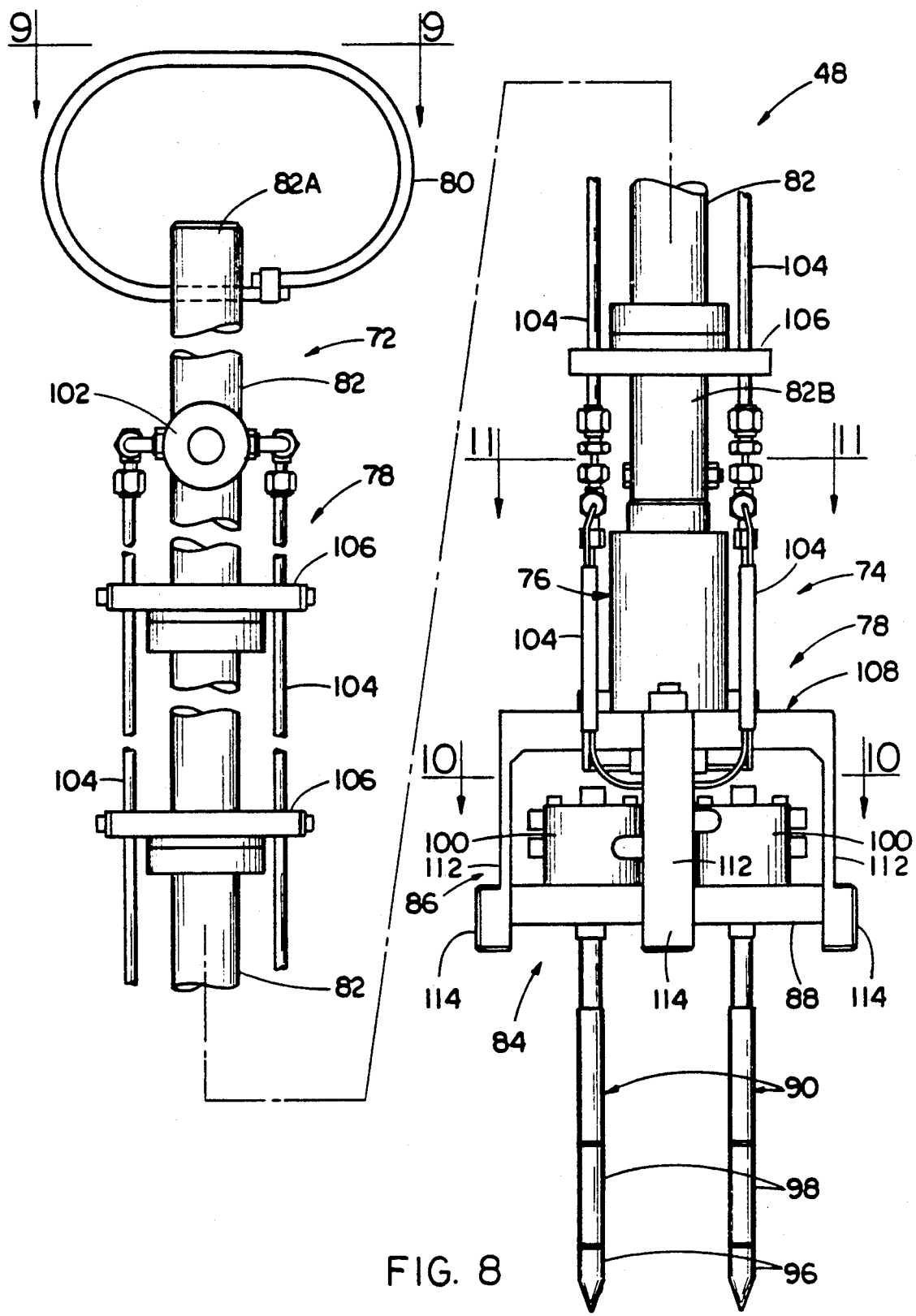
FIG. 8 is a side elevational view of a tool of the present invention for removing and replacing the removable top nozzle being attached on the guide thimbles of the reconstitutable fuel assembly of FIG. 1 by the prior art attaching structure of FIGS. 2 to 7, with the tool being illustrated partially sectioned and in a foreshortened form.
Figure 9:
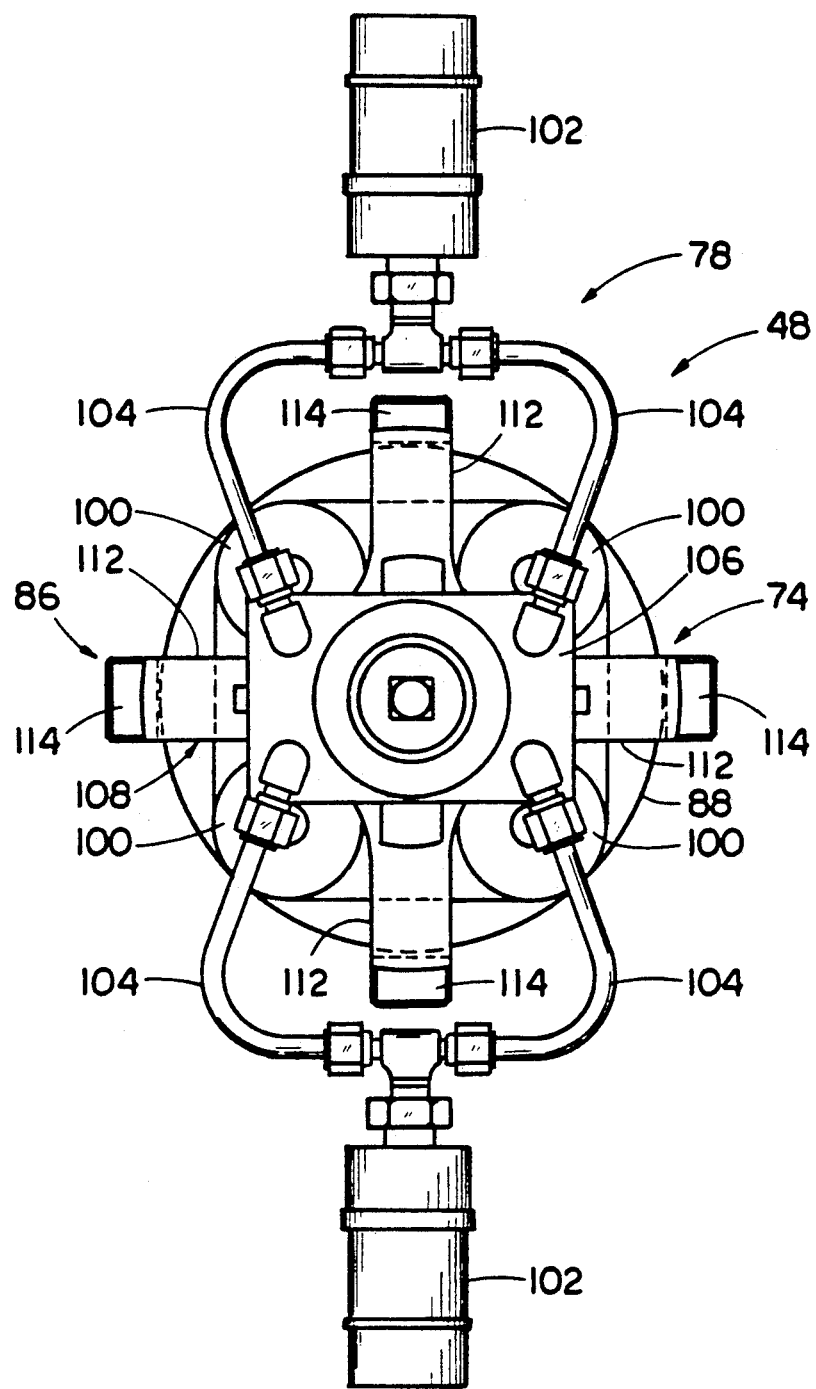
FIG. 9 is an enlarged top plan view of the tool as seen along line 9—9 of FIG. 8.
Figure 10:
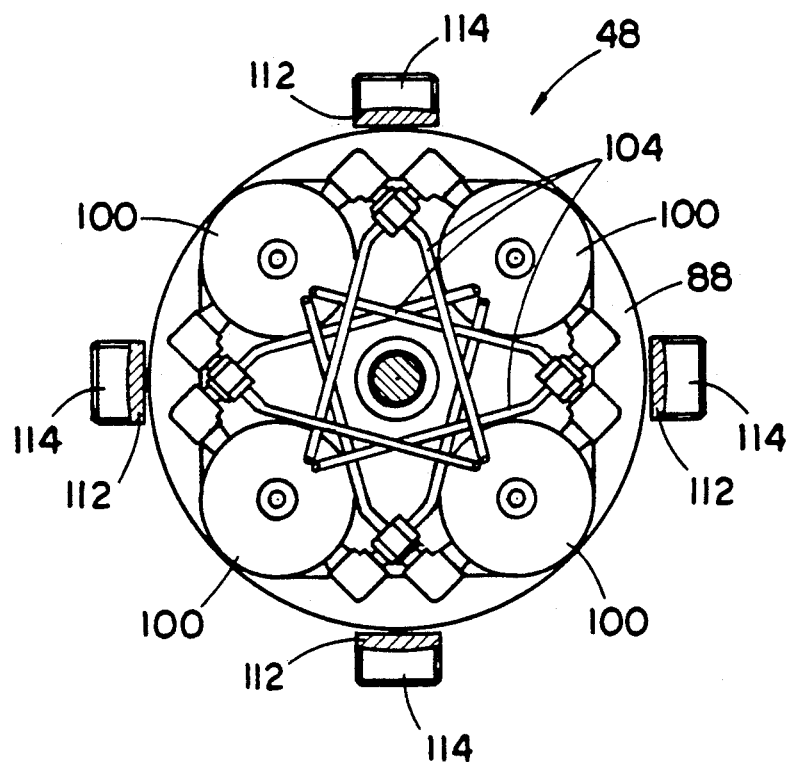
FIG. 10 is an enlarged transverse sectional view of a tool head of the tool taken along line 10—10 of FIG. 8.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a prior art reconstitutable nuclear reactor fuel assembly, represented in vertically foreshortened form and being generally designated by the numeral 10. Basically, the fuel assembly 10 includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 removably attached to the upper ends of the guide thimbles 14, in a manner fully described below, to form an integral assembly capable of being handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26,28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the nuclear reactor. A liquid moderator/coolant such as water, or water containing boron, is pumped upwardly through the fuel assemblies of the core in order to extract heat generated therein for the production of useful work.

To control the fission process, a number of control rods 32 are reciprocally movable in the guide thimbles 14 located at predetermined positions in the fuel assembly 10. Specifically, the top nozzle 22 includes a rod cluster control mechanism 34 having an internally threaded cylinder member 36 with a plurality of radially extending flukes or arms 38. Each arm 38 is interconnected to a control rod 32 such that the control mechanism 34 is operable to move the control rods 32 vertically in the guide thimbles 14 to thereby control the fission process in the fuel assembly 10, all in a well-known manner.

Prior Art Top Nozzle Attachinq Structure

Figure 19:
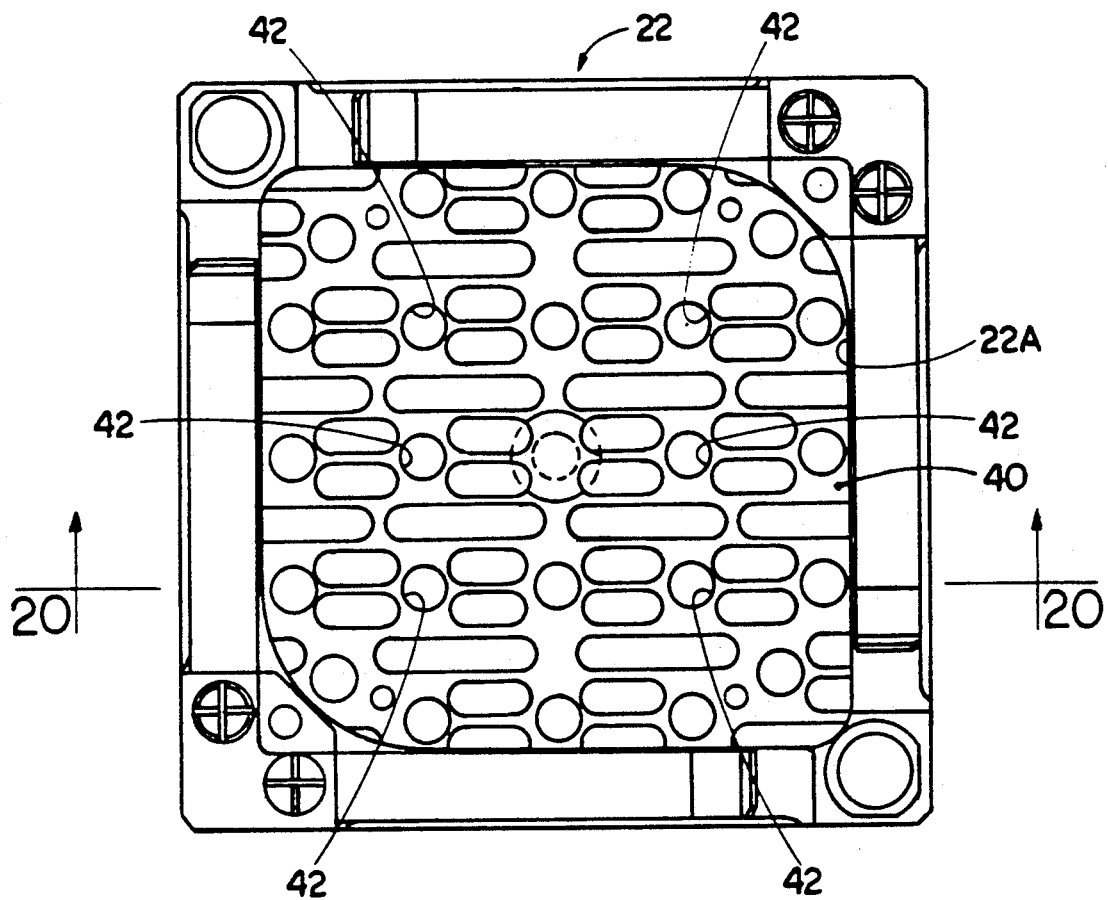
FIG. 19 is an enlarged top plan view of the removable top nozzle of the reconstitutable fuel assembly of FIG. 1 with the hold-down springs mounted thereon.
Figure 20:
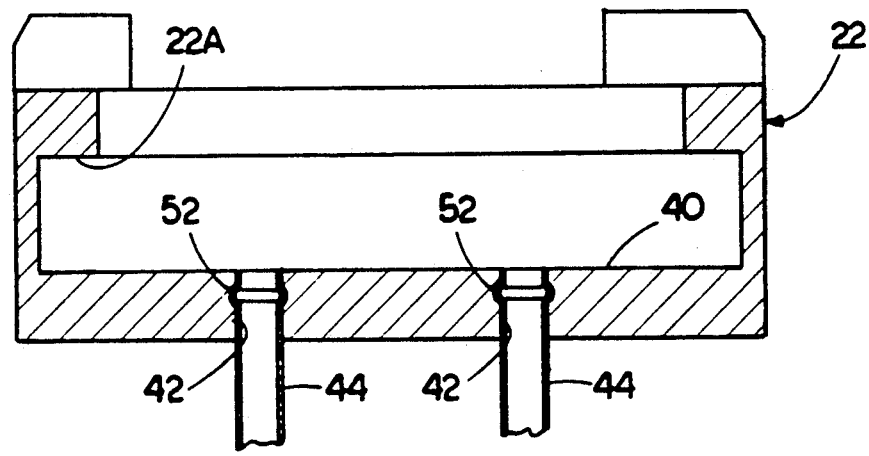
FIG. 20 is a sectional view of the top nozzle taken along line 20—20 of FIG. 19 illustrating two of the guide thimbles mounting the removable top nozzle, the hold-down springs being removed from the top nozzle for clarity.

As illustrated in FIGS. 1, 2 and 7, the top nozzle 22 has a lower adapter plate 40 with a plurality of control rod passageways 42 (see also FIGS. 19 and 20) formed through the adapter plate. The control rod guide thimbles 14 have their uppermost end portions 44 coaxially positioned within the passageways 42 in the adapter plate 40. For gaining access to the fuel rods 18, the adapter plate 40 of the top nozzle 22 is removably connected to the upper end portions 44 of the guide thimbles 14 by a prior art attaching structure, generally designated 46. The prior art attaching structure 46 is generally the same as described in above-cited U.S. Pat.

No. 4,631,168, the disclosure of which is hereby incorporated by reference thereto. Thus, the attaching structure 46 will be described herein only to the extent necessary to facilitate a complete understanding of the improved tool 48 of the present invention, to be described later on in reference to FIGS. 8-16, which is employed in removing and replacing the top nozzle 22 of the fuel assembly 10.

Referring to FIGS. 2-7, the top nozzle attaching structure 46 of the reconstitutable fuel assembly 10 includes a plurality of outer sockets 50 (see also FIG. 20) defined in the top nozzle adapter plate 40 by the plurality of passageways 42 which each contains an annular circumferential groove 52, a plurality of inner sockets 54 defined on the upper end portions 44 of the guide thimbles 14, and a plurality of locking tubes 56 inserted in the inner sockets 54 to maintain them in locking engagement with the outer sockets 50.

Each inner socket 54 of the attaching structure 46 is defined by an annular circumferential bulge 58 on the hollow upper end portion 44 of one guide thimble 14 only a short distance below its upper edge. A plurality of elongated axial slots 60 are formed in the upper end portion 44 of each guide thimble 14 to permit inward elastic collapse of the slotted end portion to a compressed position so as to allow the circumferential bulge 58 thereon to be inserted within and removed from the annular groove 52 via the adapter plate passageway 42. The annular bulge 58 seats in the annular groove 52 when the guide thimble end portion 44 is inserted in the adapter plate passageway 42 and has assumed an expanded position. In such manner, the inner socket 54 of each guide thimble 14 is inserted into and withdrawn from locking engagement with one of the outer sockets 50 of the adapter plate 40.

More particularly, the axially extending passageway 42 in the adapter plate 40 which defines the outer socket 50 is composed of an upper bore 62 and a lower bore 64. The lower bore 64 is of considerably greater axial length than the upper bore 62 and contains the annular groove 52 which is spaced a short distance below a ledge 66 formed at the intersection of the upper and lower bores 62,64. The lower bore 64 has a diameter which is greater than that of the upper bore 62, therefore, the ledge 66 faces in a downward direction. The primary purpose of the ledge 66 is to serve as a stop or an alignment guide for proper axial positioning of the upper end portion 44 in the passageway 42 when the inner socket 54 is inserted into the outer socket 50. As seen in FIG. 7, the upper edge of the guide thimble upper end portion 44 abuts the ledge 66.

The locking tube 56 is inserted from above the top nozzle 22 into its respective locking position in the hollow upper end portion 44 of one guide thimble 14 forming one inner socket 54. When the locking tube 56 is inserted in its locking position, as seen in FIG. 7, it retains the bulge 58 of the inner socket 54 in the latter's expanded locking engagement with the annular groove 52 and prevents the inner socket 54 from being moved to its compressed releasing position in which it could be withdrawn from the outer socket 50. In such manner, each locking tube 56 maintains its respective one inner socket 54 in locking engagement with the outer socket 50 and thereby the attachment of the top nozzle 22 on the upper end portion 44 of each guide thimble 14.

Additionally, securing means in the form of a slightly outwardly flared (for instance 1-2 degrees) upper peripheral marginal edge portion 68 and a plurality of small dimples 70 located along the exterior of the locking tube 56 are provided to secure the locking tube 56 at the locking position. Thus, when the locking tube 56 is inserted into the inner socket 54, a tight frictional fit is formed with the inner socket. Although the flared upper marginal edge portion 68 does not provide a positive securement, the dimples 70 do. The dimples 70 are preformed by any suitable method, such as by die forming or being coined, and so configured to have a generally pyramidal shape such that the metal forming the dimples substantially resists yielding and dimensional change regardless of the number of insertions and withdrawals of the locking tube 56 into and from the locking position.

Also, when the locking tube 56 is inserted into the upper end portion 44 of the guide thimble 14, the dimples 70 are located at the elevation of the circumferential bulge 58 and are spaced in alignment circumferentially about the exterior of the locking tube so as to extend into the bulge 58. In such manner, the dimples 70 provide a positive interference fit with the guide thimble upper end portion 44 at the bulge 58 thereof which prevents inadvertent withdrawal of the locking tube 56 from the locking position.

The locking tube 56 may be removed from the locking position in the upper end portion 44 of the guide thimble 14 either by the hand held tool disclosed in the patent application cross-referenced above or by the tool disposed in U.S. Pat. No. 4,639,998 to Shallenberger et al, also assigned to the assignee of the present invention. Since removable of the locking tube 56 by using either of these tools forms no part of the present invention, they need not be described any further in this application. The tool 48 of the present invention is used to remove the top nozzle 22 after the locking tubes 56 have first been removed. Therefore, in the following description of the tool 48 of the present invention, it will be assumed that the locking tubes 56 have already been removed.

Improved Hand Held Tool of the Present Invention

Referring to FIGS. 8-16, there is illustrated the improved hand held tool 48 of the present invention for removing and replacing the removable top nozzle 22 which is attached on the guide thimbles 14 of the reconstitutable fuel assembly 10 of FIG. 1 by the prior art attaching structure 46 of FIGS. 2 to 7. In its basic components, the tool 48 includes a handling assembly 72, a lower tool head 74, a coupling structure 76, and an actuating mechanism 78.

The handling assembly 72 of the tool 48 includes an upper circular bail or handle 80 and an elongated handle pole 82. The handle pole 82 has spaced upper and lower ends 82A, 82B and is attached at its upper end 82A to the upper handle 80. The handle pole 82 extends downwardly from the handle 80 to the lower end 82B of the pole 82.

Figure 16:
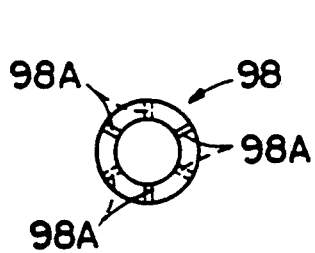
FIG. 16 is an end elevational view of the expansion sleeve on one of the probe members as seen along line 16—16 of FIG. 15.
Figure 15:
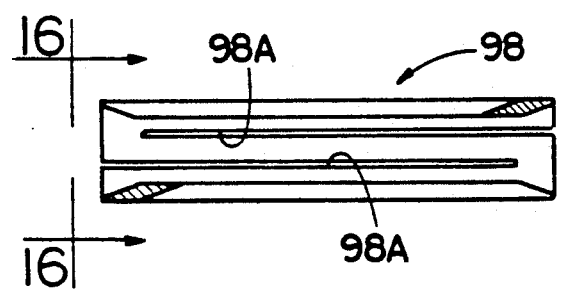
FIG. 15 is an enlarged side elevational view of an expansion sleeve of one of the elongated probe members of an anchor assembly on the tool head of FIG. 14.
Figure 14:
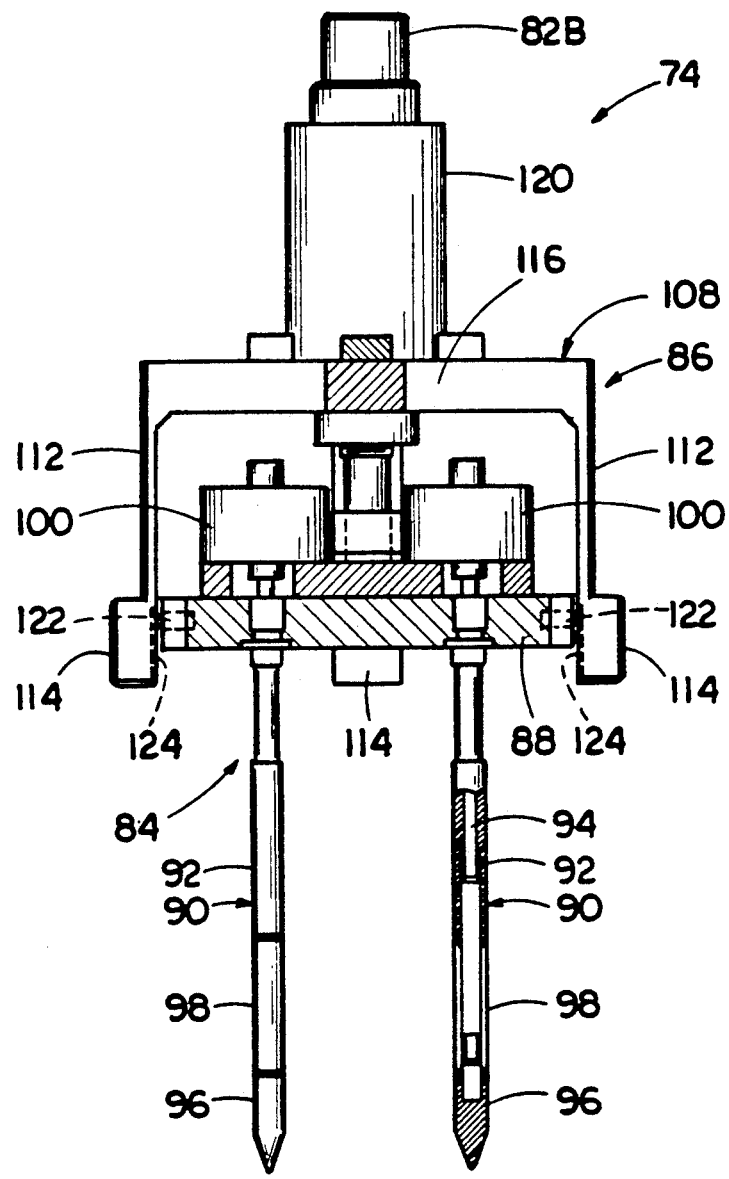
FIG. 14 is a side elevational view of the tool head, with portions broken away and sectioned, as seen along line 14—14 of FIG. 11.
Figure 17:
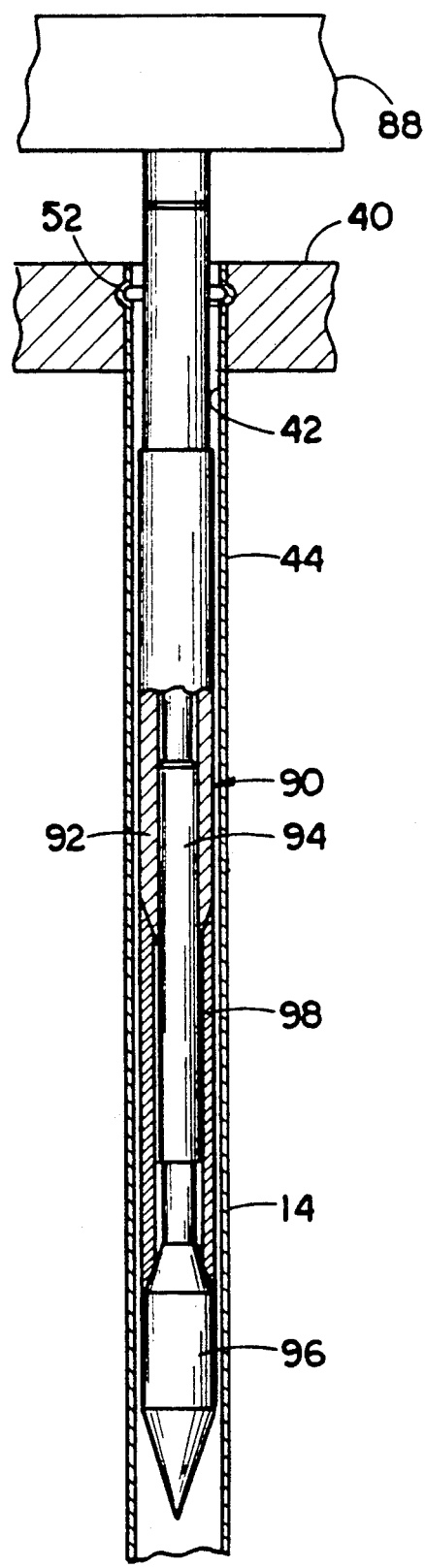
FIG. 17 is an enlarged axial sectional view illustrating one of the probe members inserted through a top nozzle adapter plate and into the upper portion of a guide thimble with the expansion sleeve in a contracted condition and disengaged with the interior of the guide thimble.
Figure 18:
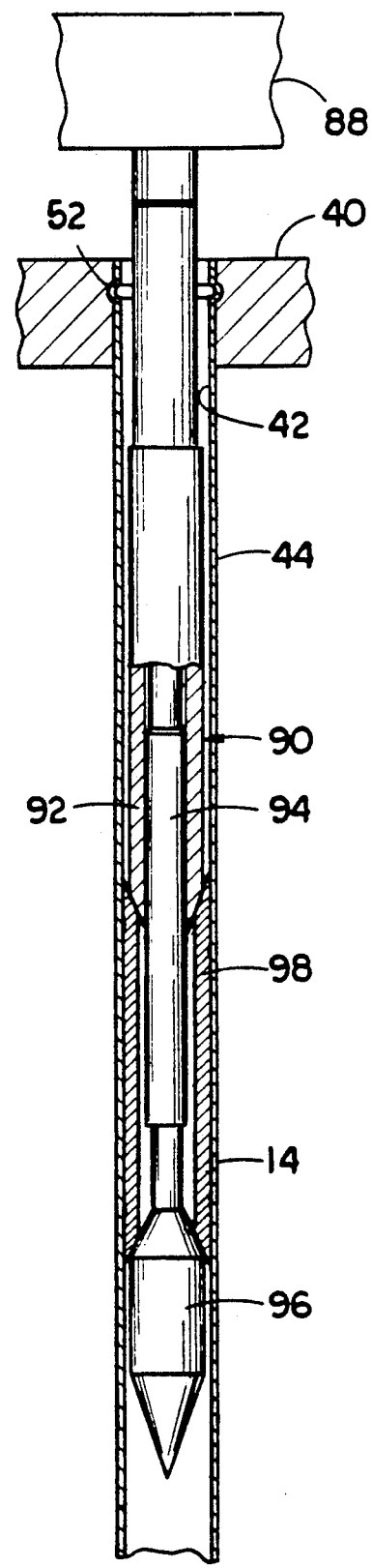
FIG. 18 is a view similar to that of FIG. 17 further showing the expansion member in an expanded condition and engaged with the interior of the guide thimble.

The lower tool head 74 of the tool 48 includes an anchor assembly 84 and a lift assembly 86. The anchor assembly 84 is matable with the upper end portions 44 of the guide thimbles 14 and actuatable between disengaged and engaged conditions with the guide thimbles 14. More particularly, the anchor assembly 84 includes a horizontal platform 88 and a plurality of elongated probe members 90 attached to the platform 88 and extending parallel to one another below the platform 88 in the same pattern as the guide thimbles 14 of the fuel assembly 10 so that the probe members 90 are insertable into the respective guide thimbles 14. Each probe member 90 has an outer tubular portion 92, a central shaft 94 movable vertically in the outer portion 92, a tapered nose 96 fixed on the lower end of the central shaft 94, and an expansion sleeve 98 captured between the outer tubular member 92 and the lower tapered nose 96. As seen in FIGS. 15 and 16, the expansion sleeve 98 has a plurality of circumferentially spaced slots 98A formed therein which permit outward bowing of the sleeve 98 upon application of compressive forces at the opposite ends of the sleeve. Thus, upon extension and retraction of the central shaft 94, the expansion sleeve 98 will move between contracted and expanded conditions for disengaging and engaging the respective guide thimble 14. FIG. 17 illustrates one probe member 90 inserted through the top nozzle adapter plate 40 and into the upper portion 44 of the guide thimble 14 with the expansion sleeve 98 in the contracted condition disengaged from the interior surface of the guide thimble 14. FIG. 18 illustrates the expansion member 98 in the expanded condition and engaged with the interior surface of the guide thimble 14. The anchor assembly 84 also includes a plurality of fluid-driven actuators 100, such as hydraulic cylinders, supported upon the platform 88 and drivingly coupled to the movable central shafts 94 of the respective probe members for actuating the expansion sleeve 98 between the expanded and contracted conditions, as desired.

The actuating mechanism 78 of the tool 48 is operable for actuating the anchor assembly 84 between the disengaged and engaged conditions with the guide thimbles 14. Referring to FIGS. 8-11, the actuating mechanism 78 is mounted on the handle pole 82 and extends from adjacent the upper handle 80 downwardly to the lower tool head 74. More particularly, the actuating mechanism 78 includes a pressurized fluid supply 102, such as containing hydraulic fluid, and a plurality of pressurized fluid supply lines 104, being mounted on the handle pole 82 by axially spaced brackets 106. The supply lines 104 extend from the supply 102 to the fluid-driven actuators 100 connected to the probe members 90 of the anchor assembly 84.

Referring to FIGS. 12, 13 and 21-24, the lift assembly 86 of the tool 48 includes a spider yoke 108 having an upper central portion 110 and a plurality of legs 112 projecting radially outwardly and then downwardly from the central portion 110 and terminating in abutments 114 that are capable or adapted to underlie a lip 22A on the top nozzle 22. The central portion 110 of the spider yoke 108 includes a central hub 116 defining an internally threaded hole 118, and a central sleeve 120 extending upwardly from the central hub 116 and slidably fitted to the lower end 82B of the handle pole 82.

Figure 21:
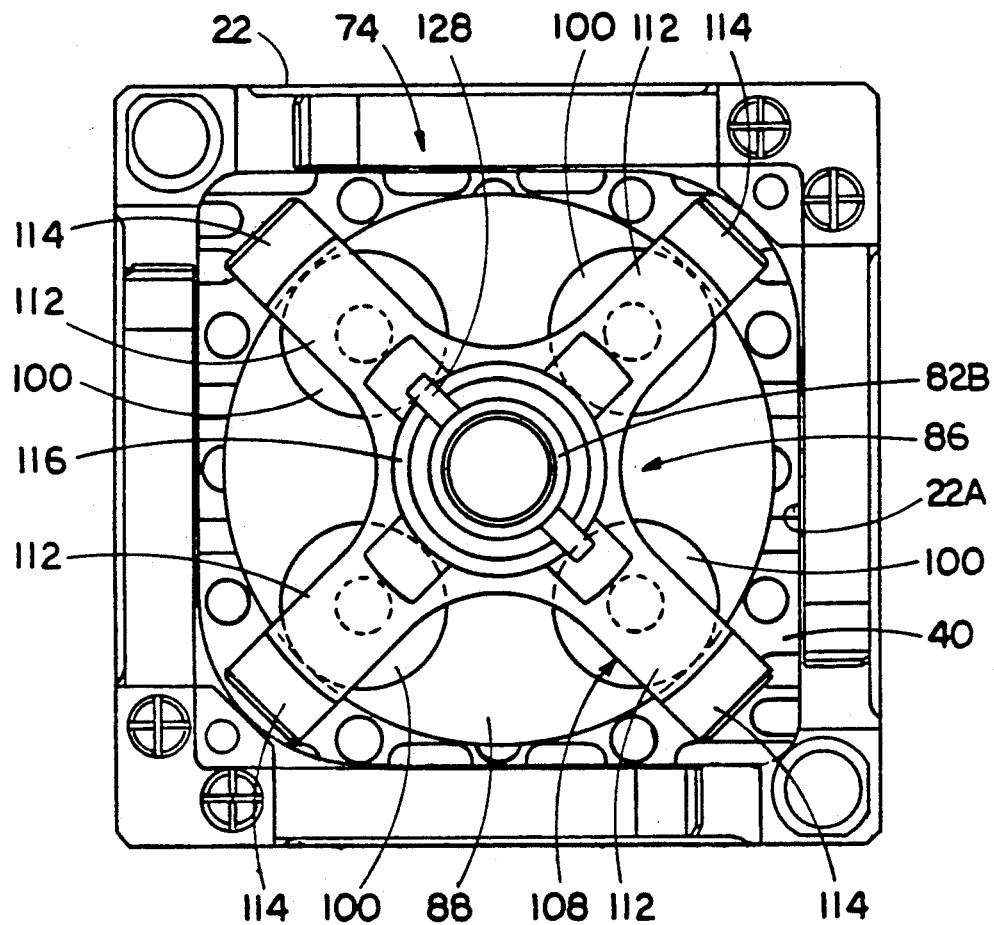
FIG. 21 is a view similar to that of FIG. 19 further showing the tool head placed on the top nozzle in an unlocked position relative to the removable top nozzle.
Figure 22:
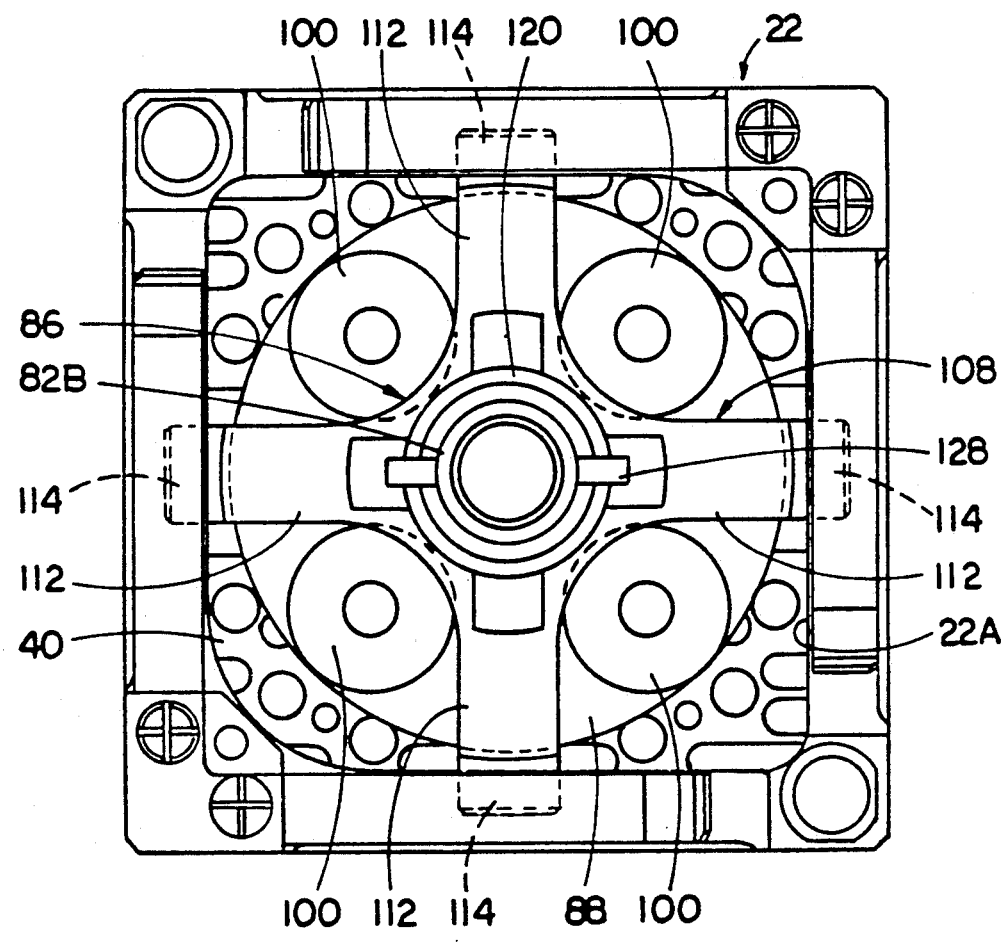
FIG. 22 is a view similar to that of FIG. 21 further showing the tool head after rotation to a locked position relative to the removable top nozzle.
Figure 23:
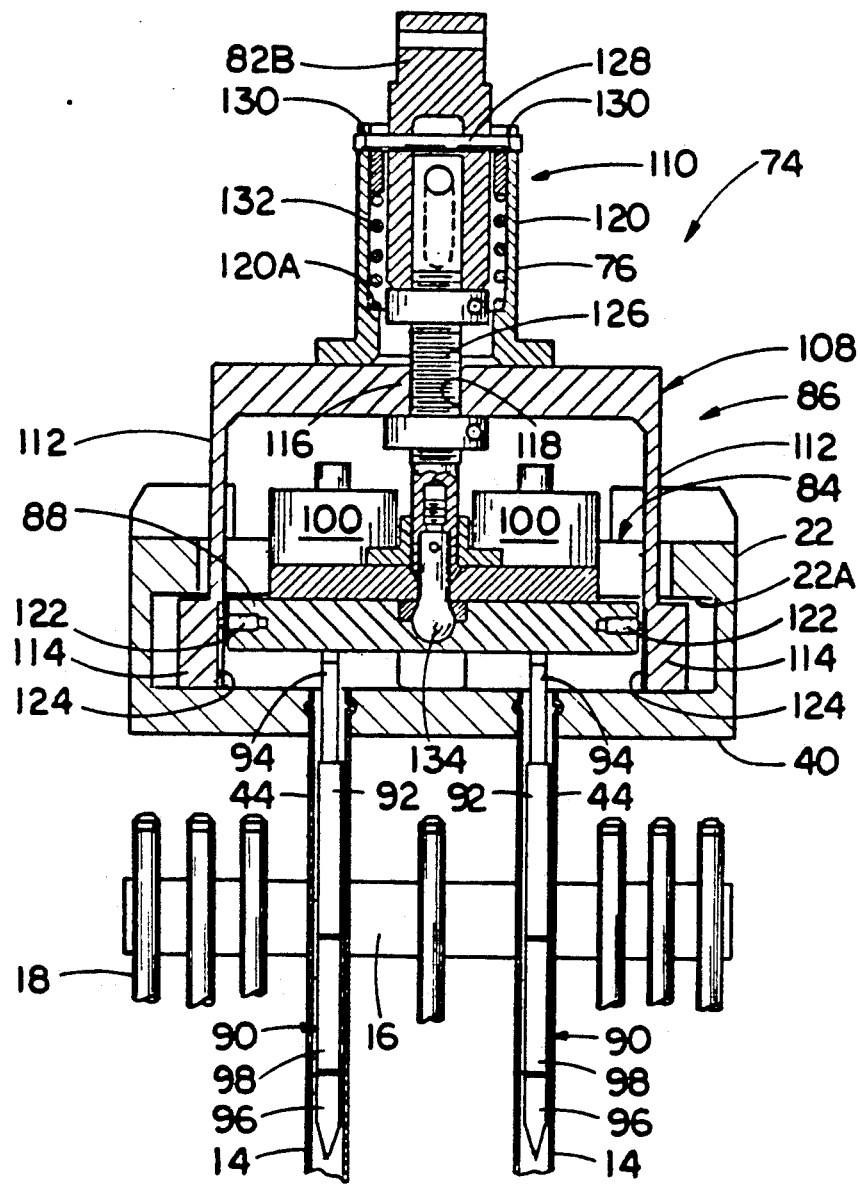
FIG. 23 is an axial sectional view of the tool head taken along line 23—23 of FIG. 22 showing the tool head in the locked position relative to the removable top nozzle but before actuation with the top nozzle still attached on the guide thimbles.
Figure 24:
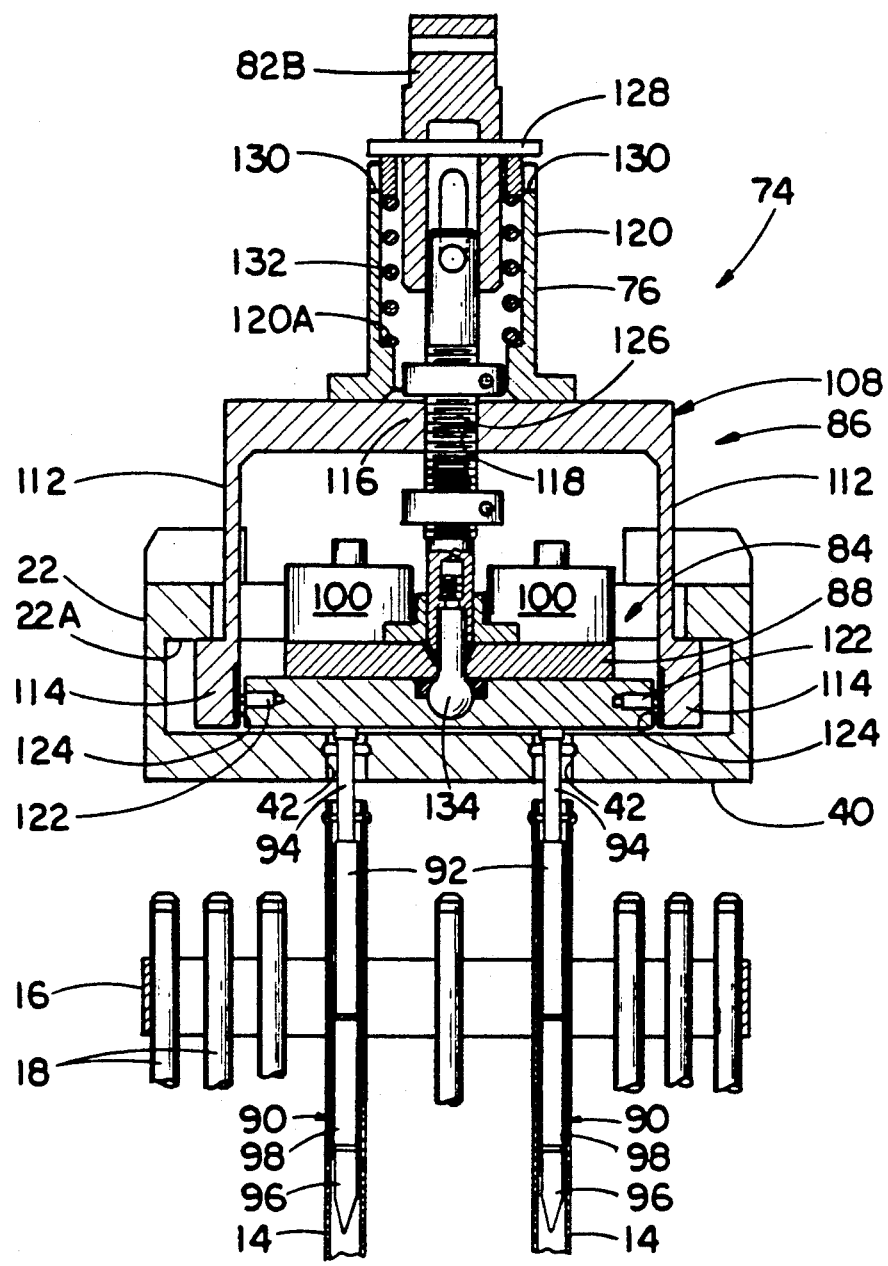
FIG. 24 is a view similar to that of FIG. 23 illustrating the tool head after actuation with the top nozzle detached from the guide thimbles.

The coupling structure 76 of the tool 48 separately couples the anchor assembly 84 and the lift assembly 86 to the lower end 82B of the handle pole 82. The coupling structure 76 is operable for connecting the lift assembly 86 and the handle pole 82 in either a first connected relation, as seen in FIGS. 12 and 23, or a second connected relation, as seen in FIG. 24. In the first connected relation of FIGS. 12 and 23, the lift assembly 86 is rotatably movable, by rotation of the handle pole 82, between unlocked and locked positions relative to the top nozzle 22 and unlatched and latched positions relative to the anchor assembly 84. When the lift assembly 86 is rotated to the locked position with respect to the top nozzle 22 as seen in FIG. 22, the abutments 114 on the legs 112 underlie the interior lip 22A of the top nozzle 22 (FIGS. 19 and 20), whereas when the lift assembly 86 is rotated to the unlocked position as seen in FIG. 21, the abutments 114 on the legs 112 are clear of the lip 22A on the top nozzle 22, permitting the tool head 74 to be raised and lower relative to the top nozzle 22. Also, when the lift assembly 86 is rotated to the locked position, it is also located at a latched position with the anchor assembly 84. In such latched position, spring-loaded pins 122 mounted at the peripheral of the platform 88 engage in vertical grooves 124 on the interior surfaces of the yoke legs 112 opposite the abutments 114

In the second connected relation of FIG. 24, the lift assembly 86 is axially movable, by rotation of the handle pole 82, along the pole relative to the anchor assembly 84 to cause lifting and detaching of the top nozzle 22 from the guide thimbles 14 once the lift assembly 86 is disposed in the latched position relative to the anchor assembly 84 and in the locked position relative to the top nozzle 22, and after the expansion sleeves 98 of the anchor assembly 84 are disposed in the engaged conditions with the guide thimbles 14.

More particularly, the coupling structure 76 includes a screw shaft member 126 slidably mounted to the lower end 82B of the handle pole 82 and threaded into the threaded hole 118 of the central hub 116 of the lift assembly spider yoke 108. The coupling structure 76 also includes a transversely extending engagement pin 128 attached through the lower end 82B of the handle pole 82. Opposite recesses 130 are defined in the top edge of the central sleeve 120 of the lift assembly spider yoke 108 for receiving the opposite ends of the pin 128 in a seated relationship. A coil spring 132 is located between and engages the engagement pin 128 and an interior shoulder 120A of the central sleeve 120 for normally imposing a biasing force on the pin 128 that moves the pin toward an unseated relationship with the central sleeve 120 so that the pole 82 is raised relative to the lift assembly 86, as seen in FIG. 24, and the lift assembly assumes the above-described second connected relation with the handle pole 82. Thus, rotation of the pole 82 will cause threading rotation of the screw shaft member 126 relative to the threaded hole 118 in the central hub 116 and thereby axial movement of the lift assembly 86 relative to the handle pole 82 and anchor assembly 84 which produces the lifting of the top nozzle 22 from the guide thimbles 14. The engagement pin 128 is capable of being moved into the seated relationship with the recessed 130 of the central sleeve, by the operator of the tool 48 imposing a downward force on the upper handle 80 and the handle pole 82 that is sufficient to overcome the biasing force of the spring 132. The lift assembly 86 thus assumes the above-described first connected relation with the handle pole 82 such that rotation of the pole 82 causes rotation of the lift assembly 86 relative to the anchor assembly 84 between the locked and unlocked positions relative to the top nozzle 22.

The coupling mechanism 76 further includes a universal ball joint 134 coupling the platform 88 of the anchor assembly 84 to the lower end 82B of the handle pole 82. The connection provided by the ball joint 134 permits unidirectional pivotal movement of the anchor assembly 84 relative to the guide thimbles 14 for facilitating ease of aligning of the anchor assembly 84 therewith for mating with the guide thimbles.

In summary, FIGS. 21 to 24 illustrate the tool head 74 being used to remove the top nozzle 22 from the upper portions 44 of the guide thimbles 14 of the fuel assembly 10. FIG. 21 shows the lift assembly 86 and anchor assembly 84 of the tool head 74 placed on the top nozzle 22 with the lift assembly 86 in an unlatched position relative to the anchor assembly 84 and in an unlocked position relative to the removable top nozzle 22. FIG. 22 shows the lift assembly 86 of the tool head 74 after rotation to a latched position relative to the anchor assembly 84 and to a locked position relative to the removable top nozzle 22. FIG. 23 shows the lift assembly 86 in the locked position relative to the removable top nozzle 22 but before actuation of the lift assembly 86 to move it upwardly away from the anchor assembly 84 to cause detaching of the top nozzle 22 from the guide thimbles 14. FIG. 24 shows the lift assembly 86 of the tool head 74 after actuation and with the top nozzle 22 detached from the guide thimbles 14. By reversal of the operations previously described in removing the top nozzle 22, the tool 48 can be used to replace the top nozzle 22 back on the guide thimbles 14.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. A tool for removing a top nozzle from a guide thimble of a nuclear fuel assembly, said tool comprising:
   (a) a handling assembly including an upper handle and an elongated handle pole having spaced upper and lower ends, said handle pole being attached at said upper end to said upper handle and extending downwardly therefrom;
   (b) a lower tool head including an anchor assembly and a lift assembly, said anchor assembly being matable with the guide thimble and actuatable between disengaged and engaged conditions with the guide thimble;
   (c) means for coupling said anchor assembly to said lower end of said handle pole and for coupling said lift assembly to said lower end of said handle pole, said coupling means being operable for connecting said lift assembly and handle pole in a first connected relation in which said lift assembly is rotatably movable, by rotation of said handle pole, between unlocked and locked positions relative to the top nozzle and unlatched and latched positions relative to said anchor assembly or in a second connected relation in which said lift assembly is axially movable, by rotation of said handle pole, along said handle pole relative to said anchor assembly to cause lifting and detaching of the top nozzle from the guide thimble once said lift assembly is disposed in said latched position relative to said anchor assembly and in said locked position relative to the top nozzle and said anchor assembly is disposed in said engaged position with the guide thimble; and
   (d) means connected to said anchor assembly for actuating said anchor assembly between said disengaged and engaged conditions with the guide thimble, said actuating means being mounted on said handle pole and extending from said upper handle to said lower tool head.

2. The tool as recited in claim 1, wherein said anchor assembly includes an elongated probe member insertable into the guide thimble, said probe member having an expansion sleeve movable between expanded and contracted positions for engaging and disengaging the guide thimble.

3. The tool as recited in claim 2, wherein said anchor assembly also includes a fluid-driven actuator drivingly coupled to said probe member for actuating said expansion sleeve between said expanded and contracted positions.

4. The tool as recited in claim 3, wherein said actuating means includes:
   a pressurized fluid supply mounted on said handle pole adjacent said handle of said handling assembly; and
   a pressurized fluid supply line extending from said supply to said fluid-driven actuator connected to said probe member.

5. The tool as recited in claim 1, wherein said lift assembly includes a spider yoke having an upper central portion and a plurality of legs projecting radially outwardly and then downwardly from said central portion and terminating in abutments that underlie a lip on the top nozzle when said lift assembly is rotated to said locked position with the top nozzle and clear the lip on the top nozzle when said lift assembly is rotated to said unlocked position therewith.

6. The tool as recited in claim 5, wherein said central portion of said lift assembly spider yoke includes:
   a central hub defining an internally threaded hole; and
   a central sleeve extending upwardly from said central hub and slidably fitted to said lower end of said handle pole.

7. The tool as recited in claim 6, wherein said coupling means includes:
   a screw shaft member mounted to said lower end of said handle pole and threaded into said threaded hole of said central hub of said lift assembly spider yoke;
   a pin attached to said lower end of said handle pole;
   means defined in said central sleeve of said lift assembly spider yoke for receiving said pin in a seated relationship; and
   means engaging said pin and said central sleeve for normally imposing a biasing force on said pin that moves said pin toward an unseated relationship with said central sleeve in which said lift assembly assumes said second connected relation with said handle pole such that rotation of said pole causes threading rotation of said screw shaft relative to said central hub and thereby axial movement of said lift assembly relative to said handle pole and anchor assembly, said pin capable of being moved into said seated relationship with said central sleeve, by imposing a downward force on said handle pole sufficient to overcome the biasing force toward said lift assembly, in which said lift assembly assumes said first connected relation with said handle pole such that rotation of said pole causes rotation of said lift assembly relative to said anchor assembly between said locked and unlocked positions relative to the top nozzle.

8. The tool as recited in claim 7, wherein said biasing force imposing means is a coil spring.

9. The tool as recited in claim 1, wherein said coupling means includes a universal joint coupling said anchor assembly to said lower end of said handle pole to permit unidirectional pivotal movement of said anchor assembly relative to the guide thimble for aligning the anchor assembly therewith for mating with the guide thimble.

10. A tool for removing a top nozzle from guide thimbles of a nuclear fuel assembly, said tool comprising:
   (a) a handling assembly including an upper handle and an elongated handle pole having spaced upper and lower ends, said handle pole being attached at said upper end to said upper handle and extending downwardly therefrom;
   (b) a lower tool head including an anchor assembly and a lift assembly, said anchor assembly having a plurality of elongated probe members being insertable into the guide thimbles, each probe member having an expansion sleeve actuatable between expanded and contracted positions for engaging and disengaging the respective guide thimbles;
   (c) means for coupling said anchor assembly to said lower end of said handle pole and for coupling said lift assembly to said lower end of said handle pole, said coupling means being operable for connecting said lift assembly and handle pole in a first connected relation in which said lift assembly is rotatably movable, by rotation of said handle pole, between unlocked and locked positions relative to the top nozzle and unlatched and latched positions relative to said anchor assembly or in a second connected relation in which said lift assembly is axially movable, by rotation of said handle pole, along said handle pole relative to said anchor assembly to cause lifting and detaching of the top nozzle from the guide thimbles once said lift assembly is disposed in said latched position relative to said anchor assembly and in said locked position relative to the top nozzle and said anchor assembly is disposed in said engaged position with the guide thimbles; and
   (d) means connected to said anchor assembly for actuating said anchor assembly between said disengaged and engaged conditions with the guide thimble, said actuating means being mounted on said handle pole and extending from said upper handle to said lower tool head.

11. The tool as recited in claim 10, wherein said anchor assembly also includes a plurality of fluid-driven actuators drivingly coupled to said respective probe members for actuating said expansion sleeves thereof between said expanded and contracted positions.

12. The tool as recited in claim 11, wherein said actuating means includes:
   a pressurized fluid supply mounted on said handle pole adjacent said handle of said handling assembly; and
   a pressurized fluid supply line extending from said supply to said fluid-driven actuator connected to each of said probe members.

13. The tool as recited in claim 10, wherein said lift assembly includes a spider yoke having an upper central portion and a plurality of legs projecting radially outwardly and then downwardly from said central portion and terminating in abutments that underlie a lip on the top nozzle when said lift assembly is rotated to said locked position with the top nozzle and clear the lip on the top nozzle when said lift assembly is rotated to said unlocked position therewith.

14. The tool as recited in claim 13, wherein said central portion of said lift assembly spider yoke includes:
   a central hub defining an internally threaded hole; and
   a central sleeve extending upwardly from said central hub and slidably fitted to said lower end of said handle pole.

15. The tool as recited in claim 14, wherein said coupling means includes:
   a screw shaft member mounted to said lower end of said handle pole and threaded into said threaded hole of said central hub of said lift assembly spider yoke;
   a pin attached to said lower end of said handle pole;
   means defined in said central sleeve of said lift assembly spider yoke for receiving said pin in a seated relationship; and
   means engaging said pin and said central sleeve for normally imposing a biasing force on said pin that moves said pin toward an unseated relationship with said central sleeve in which said lift assembly assumes said second connected relation with said handle pole such that rotation of said pole causes threading rotation of said screw shaft relative to said central hub and thereby axial movement of said lift assembly relative to said handle pole and anchor assembly, said pin capable of being moved into said seated relationship with said central sleeve, by imposing a downward force on said handle pole sufficient to overcome the biasing force toward said lift assembly, in which said lift assembly assumes said first connected relation with said handle pole such that rotation of said pole causes rotation of said lift assembly relative to said anchor assembly between said locked and unlocked positions relative to the top nozzle.

16. The tool as recited in claim 15, wherein said biasing force imposing means is a coil spring.

17. The tool as recited in claim 10, wherein said coupling means includes a universal joint coupling said anchor assembly to said lower end of said handle pole to permit unidirectional pivotal movement of said anchor assembly relative to the guide thimbles for aligning said probe members of said anchor assembly for mating with the guide thimbles.

* * * * *